United States Patent

Stabel-Weinheimer et al.

(10) Patent No.: US 6,888,911 B2
(45) Date of Patent: May 3, 2005

(54) METHOD FOR PREVENTING FRETTING DAMAGE TO FUEL RODS, NUCLEAR REACTOR FUEL ELEMENT, DEVICE FOR PREVENTING FRETTING DAMAGE, AND SPACER IN A FUEL ASSEMBLY OF A NUCLEAR REACTOR

(75) Inventors: Jürgen Stabel-Weinheimer, Erlangen (DE); Mingmin Ren, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 98 days.

(21) Appl. No.: 10/612,647

(22) Filed: Jul. 2, 2003

(65) Prior Publication Data

US 2004/0196954 A1 Oct. 7, 2004

Related U.S. Application Data

(63) Continuation of application No. PCT/EP02/00743, filed on Jan. 25, 2002.

(30) Foreign Application Priority Data

Jan. 26, 2001 (DE) .......................................... 101 03 729

(51) Int. Cl.[7] ............................................... G21C 3/336
(52) U.S. Cl. ...................... 376/438; 376/439; 376/443; 376/444; 376/462
(58) Field of Search ................................ 376/438, 439, 376/443, 444, 462

(56) References Cited

U.S. PATENT DOCUMENTS 4,726,926 A  2/1988  Patterson et al. ........... 376/438
4,756,878 A  7/1988  King et al. .................. 376/438
4,849,161 A  7/1989  Brown et al. ................ 376/438

FOREIGN PATENT DOCUMENTS

| DE | 298 08 966 U1 | 10/1998 |
| EP | 0 196 598 A1 | 10/1986 |
| EP | 0 237 064 A2 | 9/1987 |
| EP | 0 249 107 A2 | 12/1987 |
| EP | 0 273 183 A2 | 7/1988 |
| EP | 0 319 725 A1 | 6/1989 |
| EP | 0 482 384 A1 | 4/1992 |
| EP | 0 656 631 A1 | 6/1995 |
| EP | 0 656 632 A1 | 6/1995 |

*Primary Examiner*—Jack Keith
(74) *Attorney, Agent, or Firm*—Laurence A. Greenberg; Werner H. Stemer; Gregory L. Mayback

(57) ABSTRACT

Transverse vibrations of the pellet columns included in the fuel rods of fuel elements are limited by elastically mounting the fuel rod jacket tubes in the mesh of spacer grids. When the fuel rods are supported in this way, flexural vibrations of a higher order occur that lead to damage to the jacket tubes caused by fretting. These vibrations are the less dampened the more rigid the fixture of the fuel rod is. These vibration conditions are more easily excited and more strongly dampened when the pellet columns are more mobile, thereby removing vibration energy from the fuel element and avoiding damage caused by fretting. The mobility of the columns can be increased by increasing the gap between the pellet and the jacket tube, or by using constructions in which a torque $M \leq 10$ N mm on the fuel rod leads to a tilting angle $\phi \geq 0.1°$. For this purpose, the fuel rod can be retained in a mesh in such a manner that a distance $d_0 \leq 10$ mm between the highest and the lowest point of contact of the fuel rod is maintained on the holding element of the mesh.

16 Claims, 11 Drawing Sheets

METHOD FOR PREVENTING FRETTING DAMAGE TO FUEL RODS, NUCLEAR REACTOR FUEL ELEMENT, DEVICE FOR PREVENTING FRETTING DAMAGE, AND SPACER IN A FUEL ASSEMBLY OF A NUCLEAR REACTOR

CROSS-REFERENCE TO RELATED APPLICATION

This application is a continuation of copending International Application No. PCT/EP02/00743, filed Jan. 25, 2002, which designated the United States and which was not published in English.

BACKGROUND OF THE INVENTION

FIELD OF THE INVENTION

The invention lies in the nuclear technology field. More specifically, the invention relates to the prevention of fretting damage to fuel rods of a nuclear reactor, the fuel elements of which are cooled using light water, in particular of a pressurized water reactor, by modifying means which have hitherto been used in fuel elements to as far as possible limit the mobility of the fuel rods when the reactor is operating in such a way that in the flow of the cooling water the fuel rods as far as possible are unable to execute any transverse displacements or tilting movements at the locations at which they are supported in spacers, and therefore their frictional fretting against the spacers is limited. However, means of this type which are used to prevent as far as possible any mobility of the fuel rods in the spacers are subject to fatigue (for example as a result of radiation damage) under the conditions of reactor operation after just a short time, and these means which limit the mobility as much as possible are generally no longer able to exert sufficiently high forces on the fuel rods for the fuel rods to be held in the spacers by static friction even by the second operating cycle in which a fuel element of this type is used. Rather, natural oscillations then occur, which, if even a small amount of energy is absorbed from the cooling water flow, can lead to high oscillation amplitudes and to corresponding fretting.

We have, however, discovered that a different, unexpected effect can be exploited in order to prevent fretting damage. If this effect—based on knowledge of the invention—can also be observed at fuel elements in which the forces exerted on the fuel rods of the fuel element are already fatigued to a significant extent as a result of prolonged use (e.g. in the second radiation cycle), the invention therefore relates to the targeted use of these reduced forces to exploit the unexpected effect which has been discovered by us.

The invention therefore relates to the boosting of this unexpected effect in order to prevent fretting damage by the targeted and modified use of means which limit the relative mobility of the fuel rods (or at least of the pellet stacks of sintered nuclear fuel enclosed in the cladding tubes) with respect to the spacers. Furthermore, the invention relates to operation of the fuel element which exploits this effect, to a corresponding fuel element and in particular to a spacer which is suitable for this fuel element.

In a nuclear reactor which is cooled by light water, the fuel is in the form of stacks of sintered ceramic fuel pellets which are in each case enclosed in a gastight manner in a gastight cladding tube made from metal (generally Zircaloy). For the pellets to be introduced into the cladding tubes, the cladding tubes have an internal radius which is to be at most about 100 $\mu$m greater than the radius of the pellets, and the narrow gap which forms is also filled with inert gas (generally helium), in order for the heat which is generated in the fuel to be dissipated as quickly as possible into the cooling water. For reasons of reactor physics, a certain ratio of water (moderator) to fuel and a relatively short distance between adjacent pellet stacks are to be maintained. This leads to tight spatial conditions in the fuel element, with only very low tolerances, which have to be adhered to even if the coolant is guided past the fuel rods at a high speed and as a result the fuel rods are made to move in the lateral direction.

Therefore, a multiplicity of fuel rods of this type are arranged parallel to one another and at the required short distance from one another and are guided through the mesh openings of a plurality of spacers. The spacers are disposed at an axial distance above one another. The number N of these spacers used to bundle together the fuel rods of the reactor to form fuel elements is generally N=8, and the content of fissile fuel is such that this fuel element can currently remain in the reactor for at least 4 use cycles before it has to be replaced by a fresh fuel element as a result of it having "burnt up" to such an extent that the neutron balance of the fuel element becomes negative.

The most common cause of a fuel element having to be replaced prematurely or at least having to undergo expensive repair is damage to the cladding tubes of individual fuel rods caused by fretting. To prevent fretting of the fuel rods against foreign bodies ("foreign body fretting"), foreign bodies of this type are filtered out of the cooling water flow right at the base of modern fuel elements by means of foreign body filters. However, particularly at locations in the cooling water flow where particularly high levels of turbulence are encountered, fuel rods are constantly being found which have been damaged by fretting to the cladding tubes at the holding elements in the grid mesh openings of the spacers ("self-fretting") to such an extent that they have to be exchanged prematurely.

Fretting damage of this nature cannot occur if the fuel rods are each held in the mesh openings of the spacers by corresponding holding elements in such a manner that any relative movement between the fuel rods and the holding elements is suppressed. Moreover, when new fuel elements fresh from the factory are being transported, the fuel rods have to be held securely in such a manner that they cannot move to any significant extent and therefore cannot be damaged. On the other hand, however, elastic forces are generally provided for the purpose of holding the fuel rods, so that the fuel rods are not damaged during their introduction into the mesh openings of the spacers.

In the case of spacers which are formed by sleeves that are attached to one another and in each case surround the fuel rods in the shape of a ring, there are generally holding elements which provide "5-point holding" for the fuel rods, engaging on the cladding tube at three locations arranged at approximately equal intervals over the periphery of the fuel rod. At one of these three locations, there is a spring or similar elastic holding element which presses the fuel rod resiliently onto the two other locations. At these two other locations there is in each case a pair of two rigid lugs located one above the other, the upper lugs in each case being located at one upper axial level and the two lower lugs in each case being located at one lower axial level, and the two levels being at approximately the same axial distance above and below the bearing location of the spring. To tilt the fuel rod, therefore, it has to be lifted off at least one lug at one of the two levels, the spring exerting a torque on the rod which damps any such tilting movements should the spring force alone be insufficient to completely overcome the movement through static friction. It is often preferable to use spacers which are formed from webs passing through one another at right angles, referred to as "egg crate spacers;" the square mesh openings which result also allow 5-point holding of this type if the spring is fitted diagonally into one corner of the mesh opening and the two pairs of lugs are in each case located in the center of the two opposite side faces, which adjoin one another, of the mesh opening. However, with an "egg crate spacer," it is also possible to provide 6-point holding if there is a spring in the center of two adjacent side faces of the mesh opening, each of these springs pressing the fuel rod onto a pair of lugs on the opposite side.

As long as the spring forces therefore hold the fuel rod in such a manner that the static friction which occurs is able to absorb all the dynamic forces which occur at the fuel rod and could lead to relative movement of the fuel rod, there is no possibility of fretting damage. However, elastic holding elements gradually relax over the course of time, and may even do so relatively quickly under the radiation which is present in the reactor, with the result that although the above-mentioned static friction is sufficient to avoid fretting damage in fresh fuel elements, it is no longer able to prevent all movements of the fuel rod in the spacer mesh openings even as early as the second use cycle of the fuel element.

Since the fuel rods are not completely rigid, even when they are held virtually rigidly in the planes of the holding elements, they may still be made to oscillate by the turbulent cooling water flow, with oscillation nodes in these planes. The frequencies of these natural oscillations result from the intervals at which the holding elements are distributed over the length of the fuel rod. Hitherto, the spacers have been distributed equidistantly, with an axial spacing of 40 to 60 cm (~16 to 24 inches), over the length of the fuel rods, and since adjacent fuel elements in the reactor are supported against their spacers, the positions of the spacers and therefore the natural frequencies are fixed even with fresh fuel elements which are used in addition to the fuel elements which are already present. It appears clear that the natural oscillations will be excited to a lesser extent the more rigidly the holding at the holding elements becomes, and they need to be damped to a lesser extent as the oscillation amplitude is reduced accordingly.

Therefore, hitherto, it has been hoped that these natural oscillations, like other relative movements between the holding elements and those parts of the fuel rods which they hold, will not lead to any fretting damage to the fuel rods if —by using a suitably high spring force and static friction as a result of suitable selection of material and shaping of the holding elements—these relative movements are suppressed for as long as possible in the planes of the spacers. There is only a risk of self-fretting at a subsequent stage when the spring force of the holding elements relaxes.

The spacers cannot only be used to hold the fuel rods, but rather can also be used to produce other effects which are desirable for use in the reactor. For example, in pressurized water reactors, the water which is in direct contact with the hot fuel rod surface is at a higher temperature than the water which is at a greater distance from the fuel rods. Therefore, the spacers are also used as supports for elements which, by diverting the flow of coolant, generate transverse velocity components and/or turbulence in the flow of coolant and lead to mixing of the water and to the temperature being made more uniform. Therefore, spacers which have mixing vanes for diverting the flow and thereby lead to turbulence at the top edge of the spacer webs remote from the cooling water flow have long been standard practice. Hitherto, there have been no detailed investigations, but it is nonetheless inevitable that turbulence of this type will induce increased levels of movement in the fuel rods.

U.S. Pat. Nos. 4,756,878; 4,726,926; and 4,849,161 have proposed a spacer which reduces the amount of turbulence but is advantageous in terms of mixing and similar thermohydraulic properties. In this case, respectively adjacent mesh openings of the spacer grid are separated from one another by double webs, the two individual walls of the double web bearing flat against one another, but the double webs intersect with one another at right angles in the manner of the "egg crate spacer". However, the two individual walls of a double wall do not bear flat against one another in the entire region between two corners of a mesh opening, but rather in the center they are curved trapezoidally or elliptically away from one another in such a manner that a passage which runs from the bottom upward is formed, the upper end of this passage being bent in the plane of the double web in such a manner that the coolant which leaves this passage is diverted in the lateral direction. This gentle diversion makes it possible to avoid the formation of high levels of turbulence which would correspondingly excite fuel rod movements. Moreover, in those parts of two individual walls which bear against one another there is generally a window which connects the two mesh openings of the spacer which are separated by the corresponding double web and forcibly imposes pressure compensation, which may likewise counteract the formation of high levels of turbulence and fuel rod movements.

In the rectilinear part of the passage, each individual wall also has an arced curvature about an axis which is perpendicular to the fuel rods, in order to form a bearing surface for the fuel rod. Moreover, this arced curvature is divided by a longitudinal slit, so that two resilient holding elements are formed at this side wall of the flow passage. With this solution, it is possible to talk of 8-point holding, since in this case eight "holding points" are formed in one mesh opening, even though these are actually eight elongate bearing surfaces, the axial extent of which is dependent on the shape of the curvature. From the geometry which has previously been provided for the curvature, it is possible to conclude that when a fuel rod is inserted into a mesh opening of the spacer straight from the factory (i.e. a non-irradiated spacer), the eight arc-shaped holding elements formed by the curves are pressed flat over a length of approximately 3 cm and bear against the fuel rod over at least half this length (i.e. at least 15 mm). In this case, all eight bearing surfaces lie at the same axial level; ultimately, therefore, these holding elements resiliently hold only a section of about 5 mm of the fuel rod in the mesh opening.

On account of their complex geometry, spacers of this type are highly complex and expensive; their inventors and the manufacturer, who is also the Applicant of the present patent, intends them to be used for reactors with a particularly high operating temperature, where they have advantageous characteristics, with the result that they are known as "high temperature performance" ("HTP") spacers. They also have a high resistance to fretting, even at spacer positions in the fuel elements and pressurized water reactors which are at particular risk of fretting.

Particularly high-risk positions of this type are known and are present in particular wherever the cooling water flow is diverted to a relatively great extent. One example is the bottom spacer of a fuel element, where the cooling water flow emerges from the base of the fuel element and, at the entry to the spaces between the fuel rods, comes into contact with the ends of these fuel rods. However, it is in particular these ends which are mobile and have to be protected from colliding with one another by means of a spacer. This spacer is therefore at a relatively high risk and is designed to be particularly stable in the prior art (e.g. by being formed of Inconel®, which has a high material strength and resistance to radiation). In practice, it has already been necessary for a spacer with 5-point or 6-point holding to be replaced numerous times at such locations, since fretting has been observed after even a short period of use. By contrast, in fuel elements with HTP spacers, which have already been in use for two years—i.e. are at the stage of use at which the holding forces of other spacers have already become fatigued down to low levels—the marks on the fuel rods caused by friction have scarcely increased even at such high-risk locations.

When the HTP spacer is compared with the other spacers according to the prior art, which likewise use elastic spring forces, the obvious assumption is that the significantly improved fretting resistance is attributable to the increased number and larger size of the holding elements, which would make it possible to achieve better utilization and better characteristics of the spring forces and possibly also slower fatigue of these forces (i.e. therefore would make it possible to move closer to the "ideal scenario" of rigid holding). Working on the basis of this assumption, it would therefore also be more favorable, with a view to further improving the HTP spacer, to change from the Zircaloy, which has previously been used and is subject to radiation-induced material changes, to the more stable Inconel, which is frequently used in the prior art for resilient elements or for the spacers as a whole. It may then also be possible to dispense with the complicated geometry with curved passages and other details which are responsible for the high cost of the HTP spacer.

It is therefore desirable to know the mechanisms and details which are of importance with regard to fretting resistance, in order to be able to transfer and/or refine this knowledge during the development of spacers which are less expensive, are improved or are altered for other reasons. In view of the circumstances which have been outlined above, the objective of any such transfer or refinement could be to use as many elongate holding elements as possible, extending over the longest possible axial section of the fuel rod.

However, there is no validated evidence as to which of the various features which have been combined in the above-mentioned HTP spacer for reasons of high temperature performance improve the fretting characteristics of corresponding fuel elements and whether the proposed increase in number and length of the bearing points will have a positive or negative effect (or no effect whatsoever) on the fretting characteristics.

SUMMARY OF THE INVENTION

It is accordingly an object of the invention to provide a method and a device, which overcomes the above-mentioned disadvantages of the heretofore-known devices and methods of this general type and which avoids the above-mentioned damage that may occur as a result of fretting between the holding elements of the spacer at the fuel rods as reliably as possible. This leads to the special use of modified means, which have hitherto been provided for other reasons, and to a method in which this fretting damage is avoided by using fuel rods and/or spacers having particular features, and to a corresponding fuel element or a corresponding spacer.

With the foregoing and other objects in view there is provided, in accordance with the invention, a spacer for fuel rods in a fuel element of a nuclear reactor cooled by a light water coolant flow. The spacer assembly comprises:

a spacer formed with mesh openings each for a fuel rod projecting therethrough and defining a given spacer plane;

a plurality of holding elements disposed in each of the mesh openings and formed to laterally support the fuel rod and to limit and damp a relative mobility of the fuel rod with respect to the spacer and for allowing the fuel rod to be set predominantly into tilting oscillations in the spacer plane by the coolant flow; and the holding elements being configured to exert a torque of $M \leq 10$ N.mm on a fuel rod at a tilting angle $\phi=0.1°$, having an axis of rotation running perpendicular to the fuel rod in the spacer plane.

The invention requires an improved understanding of the phenomena responsible for fretting damage, since only such an understanding will make it possible, during further developments, to select the properties which are crucial with regard to fretting damage and to provide a spacer (or in more general terms a fuel element) which has the same fretting performance as or even a better fretting performance than the HTP spacer but which differs from this prior art in other features which are of little importance with regard to the fretting characteristics. This therefore means in particular the targeted selection, transfer and if appropriate improvement of certain features of the HTP spacer to other designs.

The starting point used for the tests described in more detail below was a standard 5-point spacer, in whose mesh openings, in a first test, a fuel rod in which the diameter of the pellet stack was reduced with respect to the internal diameter of the cladding tube in such a manner that, in the event of vibration of the fuel rod, the pellets are able to move with respect to one another and rub against one another was used. However, in the first test this displacement was prevented by a wire being clamped into the space between pellet stack and cladding tube. The position of the fuel pellets relative to the cladding tube was therefore fixed, and the position of the cladding tube relative to the spacer was likewise more or less fixed by the elastic spring forces acting on the cladding tube. In a second test, this wire was omitted (and therefore only the position of the cladding tube relative to the spacer was fixed), and in a third test a fuel rod whose position was likewise fixed relative to the pellets but had an external diameter which was approximately 0.05 mm less than the diameter of the opening which receives the fuel rod defined in the spacer by the holding elements (with the result that the spring forces only acted on the cladding tube in the event of major deflections of the fuel rod) was used. In all three cases, this fuel rod/spacer arrangement was exposed in a test passage to a flow of water whose turbulence induced oscillations in the arrangement.

In the first test, considerable fretting damage to the fuel rod was observed, comparable to the fretting damage also observed in fuel rods which had been made unusable during real use in the reactor.

Surprisingly, however, we observed that there was scarcely any abrasion caused by fretting in the other two tests.

The first test practically simulates the conditions in a fuel element at its beginning of life (BOL). Evidently, a high spring force with a correspondingly high static friction is insufficient to prevent fretting damage. A more detailed analysis of the movements of the fuel element and of the fuel rods shows that although the spring force is sufficient to control stochastic movements caused by the turbulent excitation, natural oscillations ("self-induced" vibrations)

occur in the form of bending vibrations, during which the fuel rods execute tilting movements in their holding elements. The more rigidly the fuel rods are held in the mesh openings, the more weakly these bending vibrations are damped. Although the more rigid holding also means that a force which is exerted only moves the fuel rod out of its at-rest position to a slight extent (i.e. in the case of the bending vibrations only locally tilts the fuel rod through a small angle $\phi$), with a periodic force the amplitudes can build up to a considerable degree and therefore the holding elements lead to correspondingly high levels of fretting.

In the second test, the fuel pellets move with respect to one another, and corresponding internal friction in the pellet stack destroys kinetic energy. Therefore, further to the static friction there is also increased damping of the bending vibrations, which on account of this damping can also only build up to low amplitudes. Accordingly, the tilting movements and the corresponding fretting are significantly weaker.

In the third test, the holding elements—taken as a mean over an oscillation period—exert a reduced force on the fuel rods, approximately corresponding to the state of the fuel element at its end of life (EOL). While previously it was possible to believe that the longer the fuel element was used and therefore the weaker the spring force of its holding elements became, the more susceptible it would be to fretting damage, it has in fact been found that as the holding elements become tired the fuel element becomes ever less prone to fretting. An analysis of the oscillation states indicates that in the third test the "self-induced oscillations" have been damped to the same extent as in the second test and therefore only correspondingly low amplitudes of the tilting movements occur.

Therefore, to avoid fretting damage, the BOL state should as far as possible match the EOL state of previous fuel elements.

Therefore, the result is that high spring forces and a correspondingly high static friction lead to the excitation of undamped natural oscillations with tilting movements which promote fretting, i.e. are harmful, while increased damping extracts energy from a natural oscillation of this type should such an oscillation be induced by flow turbulence, and therefore limits the amplitudes of the tilting movements and prevents fretting.

Accordingly, a suitable means for increasing the damping can be achieved by increasing the internal friction in the fuel rod, for example by the unirradiated fuel rod being produced from a pellet stack whose outer diameter is approximately $300\mu$ (but at least $250\mu$) less than the inner diameter of the cladding tube. Although this limits the mobility (with respect to the spacer) of those sections of the pellet stacks which pass through the spacer, it only limits this mobility to a level which is nevertheless higher than that of the prior art.

However, the damping can also be set by means of the energy which can be extracted from the fuel element by an increased transverse mobility of all (or at least some) of the fuel rods in the cells of the spacers. For example, it is possible to use spacers with holding elements which offer the fuel rod a receiving opening whose radius is approximately 0.05 mm larger than the external radius of the fuel rod.

A measure of this nature is therefore a means which on the one hand indirectly limits the mobility of the pellets by means of the interaction between pellets and cladding tube, but on the other hand increases the translational mobility of the cladding tubes and of the pellet stacks compared to the prior art.

However, a suitable way for increasing the damping is provided in particular if the holding elements are designed in such a manner that, at a tilting angle $\phi=0.1°$ of the fuel rod with respect to the spacer, they exert a torque of at most $M=10$ N.mm on the fuel rod. This can be achieved, for example, if the fuel rod is held against the bearing surfaces of the holding elements of a mesh opening in such a manner that the highest point at which the fuel rod is in contact with one of these bearing surfaces lies at most 10 mm (advantageously at most 5 mm, in particular at most 3 mm) above the lowest point at which the fuel rod is in contact with one of the holding elements of this mesh opening. However, the longitudinal extent of each bearing surface should be at least approximately 1 mm, in order to prevent punctiform loads being exerted on the fuel rod. According to this embodiment, therefore, the fuel rod is only held by the holding elements over a relatively short distance (axial length at most 10 mm or less), and therefore in all realistic circumstances the spring force of the holding elements will be insufficient to prevent relative tilting movements of the fuel rods of 0.1°. However, this force effectively damps such tilting oscillations. However, the greater the axial length of that part of the fuel rod which is held by the holding elements is selected to be (i.e. the more rigid the holding of the rod in the holding elements becomes), the greater the force required for one-off deflection becomes, but on the other hand the damping of the bending vibrations is reduced and therefore the amplitude of these vibrations increases.

We have therefore discovered that, with regard to the oscillations of the fuel element which are excited by the flow of water, bending vibrations are of crucial importance, and the excitation and amplitude of these vibrations increases the more rigid the fuel rods and the holding of the fuel rods in the fuel elements become, since this rigidity is associated with a decrease in the damping action. Rigid holding therefore promotes fretting and causes damage. Therefore, compared to the prior art the mobility has to be increased by suitable means.

Those of skill in the pertinent art will recognize that this discovery and the resultant means for increasing the damping do not form part of the prior art and also do not make use of the prior art.

In once more summarizing the invention, the same therefore relates to the use of fuel elements in a reactor cooled with light water, in which at least sections of the fuel rods of the fuel element are set in transverse motion by the flow of coolant, and in which the fuel rods are guided through mesh openings of a plurality of spacers arranged at axial distances above one another, but the transverse movements are limited by holding elements in these cells. However, at the latest by the second use cycle of the fuel element, the holding elements no longer have sufficient spring force to suppress, by static friction, relative movements between the holding elements and the fuel rods caused by natural oscillations of the fuel element. According to the invention, in this use of the fuel element spacers and fuel rods which are matched to one another in such a manner that energy is extracted from the natural oscillations of the fuel element by increased damping are used.

As will also be demonstrated experimentally, the flow of cooling water in the fuel element and in the fuel rods in practice only excites oscillations which are referred to as self-induced natural oscillations and represent solutions to the natural oscillation equation $$\frac{d^2x}{dt^2} + D \cdot \omega \cdot \frac{dx}{dt} + \omega^2 x = 0$$

where D denotes the damping and can be expressed in per cent, while x denotes the transverse deflection and ω denotes the frequency. These oscillations are natural oscillations with the bending vibration modes up to the order N, where N is the number of spacers used in the feel element, and these natural oscillations of the fuel element are in phase with the corresponding natural oscillations of the fuel rod. As will also be demonstrated below, in particular the orders (N-2) and (N-3) are responsible for fretting. For the order (N-2), the damping of an oscillation with an amplitude of 50 μm is less than 0.35% in a fuel element with standard 5-point holding of the fuel rods (in air); however, the invention teaches damping this order to a greater extent. The lower orders are less important for the fretting characteristics, since they are ordinarily damped to a significantly greater extent and therefore corresponding natural oscillations can only be excited with a significantly reduced amplitude, as will also be demonstrated below. Moreover, the increased damping of the (N-2) mode is likewise associated with an increased damping of the lower modes, and consequently it is sufficient to concentrate on the (N-2) mode.

In this context, the term "increased damping" is understood as meaning damping which is above the level which can be produced with standard 5-point holding.

In this method, the increased damping can be established by increasing the energy which is extracted from the fuel rods, if their natural oscillations are excited, by the mobility and friction of the fuel pellets contained in the fuel rods, i.e. the energy which can be extracted from the natural oscillations of the fuel rods by "internal damping". An example of this has been given in the second test mentioned above.

In this method, to avoid fretting damage, the increased damping can also be established by changing the energy which can be extracted from the fuel element by means of increased translational mobility of at least some fuel rods in some cells of the spacers, i.e. the energy which can be extracted by damping of the lateral movements of the fuel rods in the spacer mesh openings. An example of this has been given in the third test mentioned above.

However, both options require the overall design of the fuel element to be modified accordingly, i.e. to be changed with respect to the known, tried-and-tested fuel elements, which is only possible after protracted safety calculations and trials.

In this method, to avoid fretting damage, it is preferable for the increased damping to be established by means of holding elements which, at a tilting angle φ=0.1° of the fuel rod, exert a torque of at most M=10 N.mm on the fuel rod. In at least one spacer (in particular the bottom spacer in a pressurized water fuel element), the holding elements are preferably designed in such a manner in most of the mesh openings which receive a fuel rod (in particular in all the mesh openings which receive fuel rods). This possibility has likewise already been explained in more detail. Of course, this does not apply to mesh openings through which fuel rods do not pass, such as for example the mesh openings with control rod guide tubes in the pressurized-water reactor.

Furthermore, the invention leads to a nuclear reactor fuel element cooled with a flow of light water which has fuel rods which are guided through mesh openings in a plurality of spacers arranged at an axial distance above one another and the lateral mobility of which is limited by holding elements which are arranged in the mesh openings and exert holding forces on the fuel rods. With a fuel element of this type, at the latest by the second use cycle of the fuel element the holding forces of the holding elements will no longer be sufficient to prevent relative movements between the holding elements and the fuel rods which are induced by natural oscillations of the fuel rods in the flow of light water. According to the invention, with a fuel element of this type, at least some fuel rods and mesh openings are matched to one another in such a manner that energy is constantly extracted from the natural oscillations of the fuel element by increased damping. Advantageously, at least the inner fuel rods and the bottom spacer are matched to one another in such a manner. (In the present context, the term "inner fuel rods" is to be understood as meaning the fuel rods that are not located directly at the edge of the fuel element.)

The invention also leads to an advantageous spacer for a plurality of fuel rods which in each case pass through a mesh opening of a spacer, this spacer being intended for a fuel element of a nuclear reactor cooled by a flow of light water and, in a mesh opening of this type intended to receive a fuel rod, in each case having a plurality of holding elements which, in the unirradiated state of the spacer, hold the fuel rod in a predetermined lateral position with a predetermined holding force. In a spacer of this type, at least as early as the second use cycle of the fuel element the holding force is no longer sufficient to prevent a relative movement between the spacer and the fuel rods which represents a natural oscillation of the fuel element caused by the flow of light water.

According to the invention, the holding elements are designed in such a manner that, after the fuel rod in question has been inserted, they bear against this fuel rod by means of a plurality of elongate bearing surfaces, the longitudinal extent of which is in each case at least 1 mm. The highest bearing point of the fuel rod in this mesh opening is in this case at most 10 mm (preferably at most 5 mm, in particular at most 3 mm) above the lowest bearing point of the fuel rod in the same mesh opening; in other words: if the holding elements are viewed as part of the spacer, the highest and lowest point of contact between fuel rod and spacer define an axial section on the fuel rod which is held by the spacer and at most has the length indicated above.

Although holding elements which hold such a short piece of the fuel rod are able to absorb and practically suppress the stochastically occurring translational relative movements of these pieces even after operationally induced relaxation of the spring forces, they cannot absorb relative tilting movements of these pieces even in the unirradiated state, but rather still allow micro-movements. If these micro-movements are excited by bending vibrations, they generate a friction which does not cause fretting damage but does have a damping action on these vibrations.

In all embodiments, it is advantageous if a rigid safety element is provided in each case above and below a resilient holding element, bearing against a fuel rod, of a mesh opening, this rigid safety element, in the at-rest state, being at a distance of between 0.1 and 0.5 mm (advantageously about 0.3 mm or less) from the corresponding fuel rod. This predetermines a maximum deviation on the part of the fuel rod and ensures that it is impossible for there to be less than a minimum distance between the walls of the spacer and the fuel rod (and also between two adjacent fuel rods), as is often required for various reasons.

The discovery described above is intended in particular to lead to a further development of the HTP spacer, i.e. to subjects which differ from this known spacer. By indicating the advantageous size of the bearing surfaces, the invention teaches that resilient holding elements must neither be deformed excessively by a fuel rod, which would lead to an excessively large bearing surface in the axial direction, nor form a contact area which is too small. These requirements may be satisfied if the holding elements become fatigued over the course of the irradiation but are advantageously taken into account during the design and production of the unirradiated spacers. In particular, consideration may also be given to spacers having the features described in the claims and having mesh openings which have fewer than eight bearing surfaces. However, it is also conceivable to use spacers (and correspondingly equipped fuel elements) in which one or other feature which has been outlined in connection with the HTP spacer or has been shown in drawings 19 to 21 has been dispensed with. This opens up the option of simplified or improved designs.

It is preferable for at least the mesh openings which are intended for the inner fuel rods to be of identical design. In the case of spacers with square mesh openings, the four mesh opening walls advantageously each bear holding elements. It is advantageous for all the holding elements to be formed as elastic springs. In hexagonal mesh openings, the holding elements or pairs of holding elements are arranged in such a manner that they are distributed at approximately the same peripheral angle over the periphery of the fuel rods, with at least three mesh opening walls bearing holding elements. It is advantageous for all the mesh opening walls which bear holding elements for inner rods to be of identical design.

Hitherto, only elastic, elongate holding elements which are oriented parallel to the fuel rods have been investigated and successfully tested. According to the invention, the extent in the axial direction must be limited, in order to avoid rapid excitation. If the damping is also significantly dependent on micro-movements between the bearing surfaces, it may also be advantageous for the elongate bearing surfaces to be oriented perpendicular to the fuel rods, since in this case the length of the bearing surface can be increased with respect to the damping even with the desirably short axial extent.

Other features which are considered as characteristic for the invention are set forth in the appended claims.

Although the invention is illustrated and described herein as embodied in a method for preventing fretting damage to fuel rods, a corresponding nuclear reactor fuel element, means used therefor, and a corresponding spacer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

It will be clear to those skilled in the pertinent art that the invention is based on the standard operation of a nuclear reactor whose fuel elements are cooled using light water. The fuel rods of a fuel element of this type contain pellets of sintered nuclear fuel which have been layered on top of one another to form stacks and are enclosed in cladding tubes. Since fuel elements of this type have a plurality of spacers for the fuel rods, each spacer has sections of the pellet stacks passing through it, the spacers and cladding tubes being used as means to limit the mobility of these sections (and therefore also the overall mobility of the pellet stacks), at least relative to the spacers. As a result, movements which are similar to state (b) in FIG. 9—explained in more detail below—are substantially impossible or can only occur with extremely low amplitude and considerable damping. However, predominantly bending vibrations, corresponding to state (c) in FIG. 9, do still occur.

The prevention of state (b) is necessary and becomes more effective the stronger the action of the means which damp the movements by limiting this relative mobility. Up until now, it has been assumed that means which provide the maximum possible limitation will also damp state (c) to a correspondingly strong degree. However, the first test described above demonstrates that the opposite is in fact the case. The invention therefore provides for these means to be designed in such a way that, at least for the abovementioned sections of some fuel rods in at least one spacer, they increase the mobility, compared to the limiting means in the comparable prior art. Then, during the corresponding movements, energy is also extracted from the abovementioned state (c) in FIG. 9, and this bending vibration is damped to an increased degree. In this context, even a slight increase in the damping leads to a reduction in the friction on the cladding tubes to a completely unexpected extent.

Since the fretting damage observed in boiling water reactors has hitherto been almost exclusively caused by the foreign body fretting mentioned in the introduction, but in pressurized water reactors the cause of most of the damage (which is in any case extremely rare) is direct fretting between fuel rod and holding elements, the invention is primarily intended for fuel elements in pressurized water reactors and is described for use therein.

Figure 1:
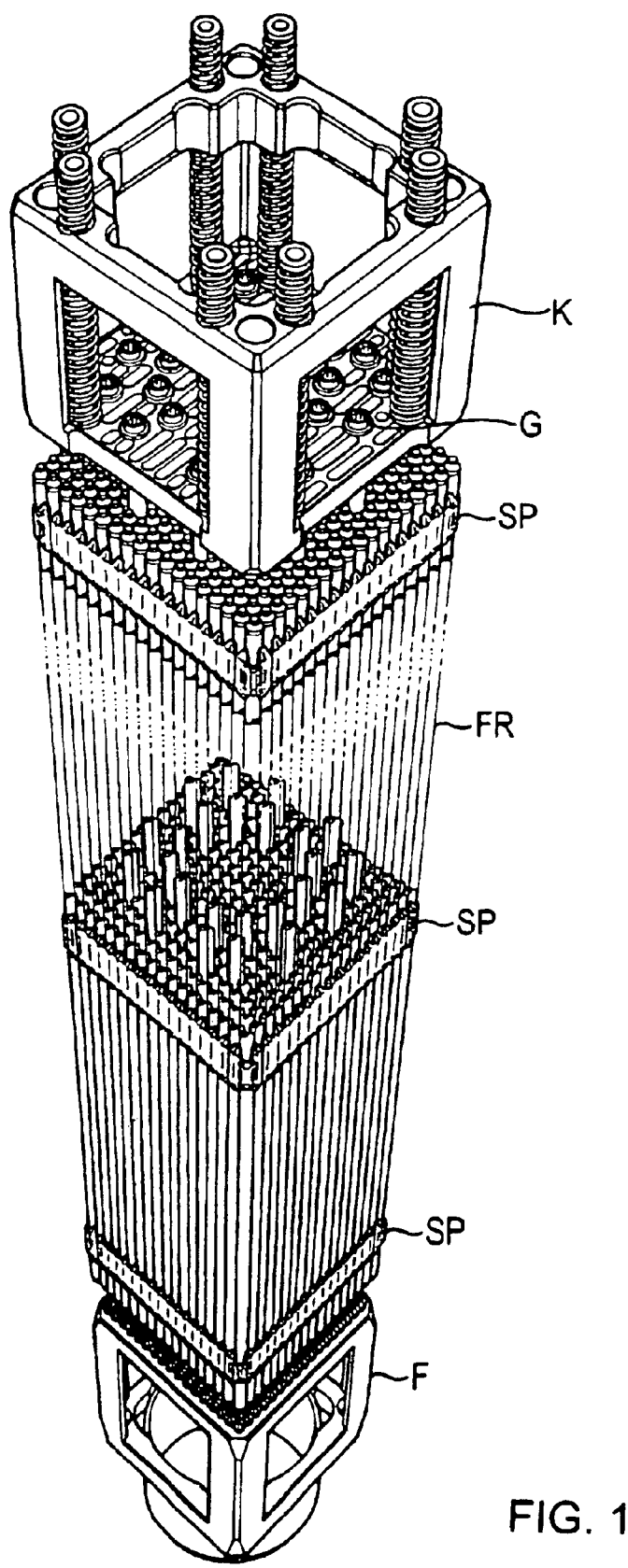
FIG. 1 is a top perspective view of a pressurized water fuel element.

Referring now to the figures of the drawing in detail and first, particularly, to FIG. 1 thereof, there is shown pressurized water fuel element or fuel assembly with a head K and a base or foot F, which are connected to one another by control rod guide tubes G. A plurality of (generally 8 to 9) spacers SP are secured to these guide tubes; these spacers may, for example, comprise sleeves which are welded onto one another but in the case illustrated are designed as grids comprising webs which cross one another at right angles. The guide tubes G and the fuel rods FR are inserted into the circular or rectangular mesh openings which are formed as a result.

Figure 2:
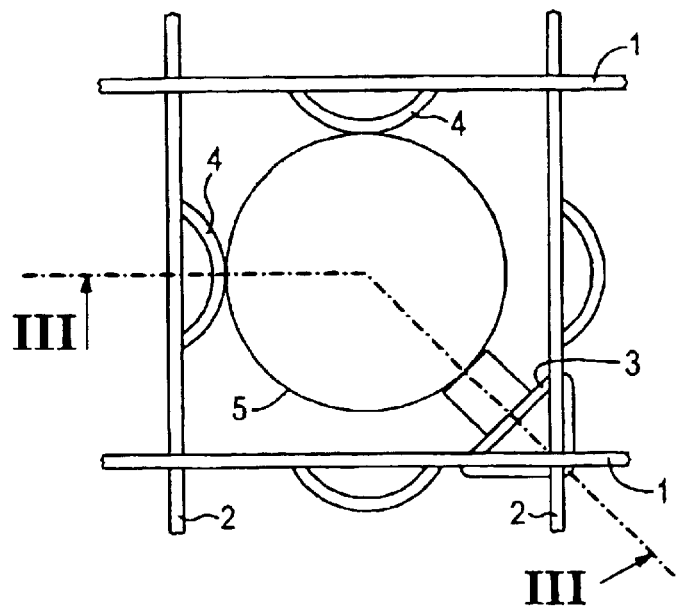
FIG. 2 is a plan view onto a mesh opening of a spacer according to the invention.

The plan view of a mesh opening of an "egg crate" spacer in FIG. 2 shows the webs 1 and 2 made from Zircaloy which cross one another and in this case form a corner with windows into which a spring 3 made from Inconel® is inserted. Those walls of the mesh opening which adjoin one another at the opposite corner each have a curvature facing into the same mesh opening, which can be seen in more detail from FIG. 3 and forms a lug, i.e. a practically rigid holding element 4, onto which the fuel rod 5 is pressed by the resilient holding element 3. As can be seen from FIG. 3, the resilient and rigid holding elements 3, 4 are located at the same level, the axial distance d0 from the highest point h1 at which the fuel rod 5 bears against one of the holding elements 3, 4 to the lowest bearing point $h_2$ in this case being 3 mm. In this design of the holding elements, the bearing surfaces between the fuel rod 5 and the holding elements 3, 4 are virtually linear and are oriented parallel to the axis of the fuel rod. The spring force of the resilient holding element 3 is usually more than 5 N.

As an alternative to this, it is also advantageous for the curves 4 likewise to be formed as resilient holding elements.

Figure 3:
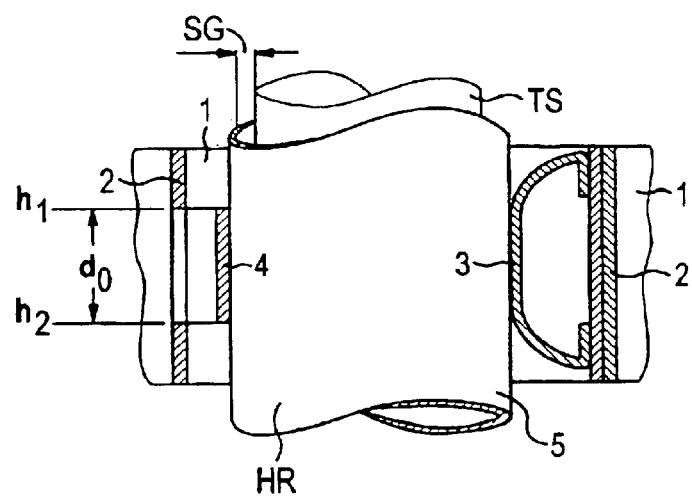
FIG. 3 is a partial longitudinal section taken through the mesh opening along the line III—III in FIG. 2.

FIG. 3 also shows that a gap SG is formed between the cladding tube HR and the pellet stack TS enclosed therein in the ex-factory state. If a fuel element is being newly designed and matched to the reactor physics, it may be advantageous to provide a gap width of approximately 150μ. In the present test, the gap is determined by a reduced pellet diameter, since cladding tubes with a smaller internal and external diameter are provided for a later test. In the first test, however, a wire is clamped into the relatively large gap, fixing the pellet stack TS inside the cladding tube.

Figure 4:
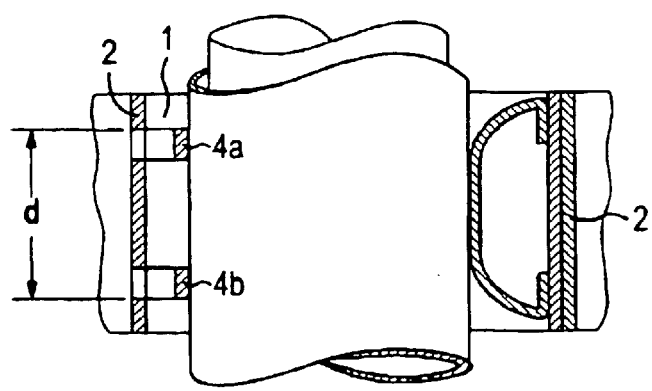
FIG. 4 is a corresponding longitudinal sectional view for a conventional 5-point spacer.

In contrast with the spacer described, FIG. 4 shows a longitudinal section through a conventional 5-point holder, in which the fuel rod is now pressed onto in each case one pair of lugs 4a, 4b positioned one above the other on the other mesh opening walls by a resilient holding element. With this holding arrangement, the distance do in FIG. 3 corresponds to the distance d, which is usually at least approximately 30 mm.

Figure 5:
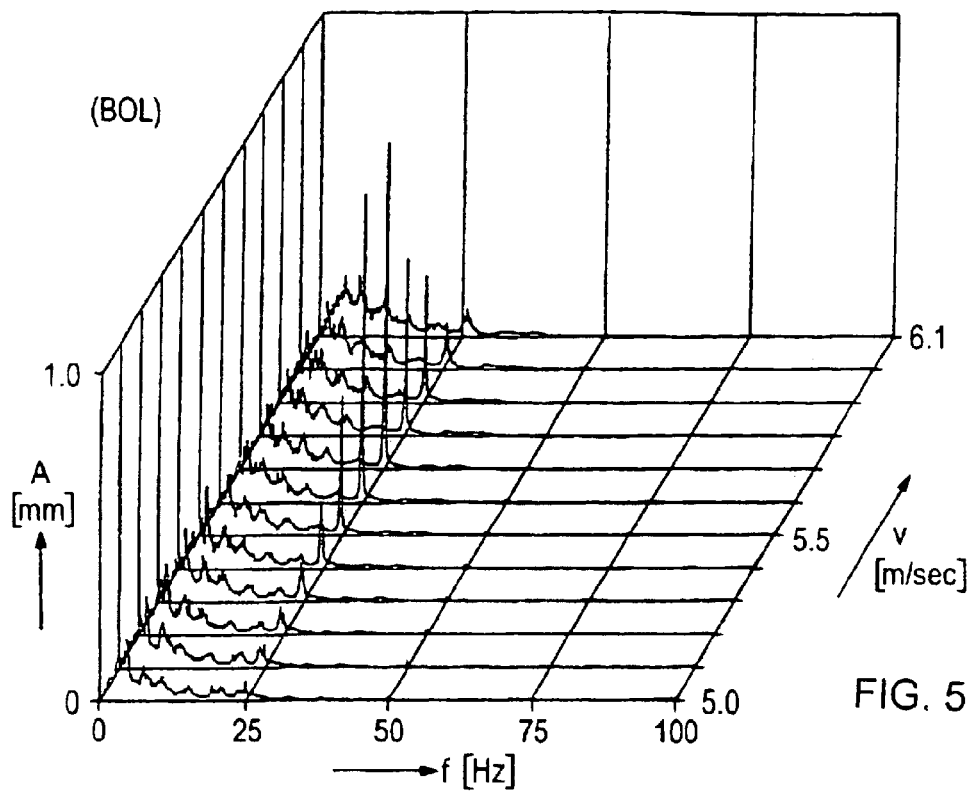
FIGS. 5 and 6 are graphs plotting the way in which the oscillation spectra of a conventional fuel element in the BOL and EOL state are dependent on the flow velocity of the cooling water.
Figure 6:
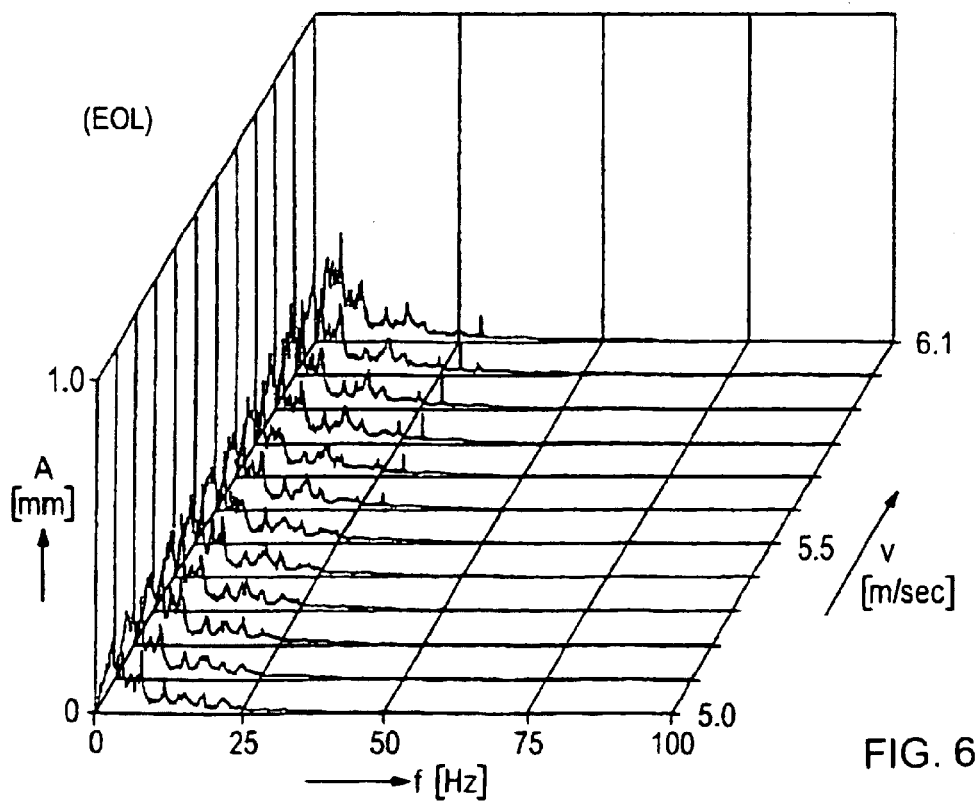

In the unirradiated state (BOL state), a fuel element with spacers which form a 5-point holder as shown in FIG. 4 is exposed to a flow of cooling water with the variable flow velocity v, FIG. 5 showing the amplitude A of the movements of the fuel element, measured at the guide tubes in the center between two spacers. It can be seen that, within a flow velocity range v between approximately 5.5 and 6.0 m/s, particularly strong oscillations with a frequency of approximately 25 Hertz are excited in the fuel element. To simulate the behavior at the end of life (EOL state) of the fuel element—i.e. weaker (relaxed) spring forces—in the test shown in FIG. 6 the diameters of the fuel rod cladding tubes have been reduced slightly, while the same type of spacer with the same holding elements has been used. Although the gap between fuel rod and cladding tube is now smaller, it is likewise bridged by a wire in order to fix the pellet stack. It has been found that the reduced external diameter of the cladding tube and the correspondingly greater mobility of the fuel rod in the holding elements have caused at least the amplitudes which are so striking in FIG. 5 to be substantially overcome.

Figure 7:
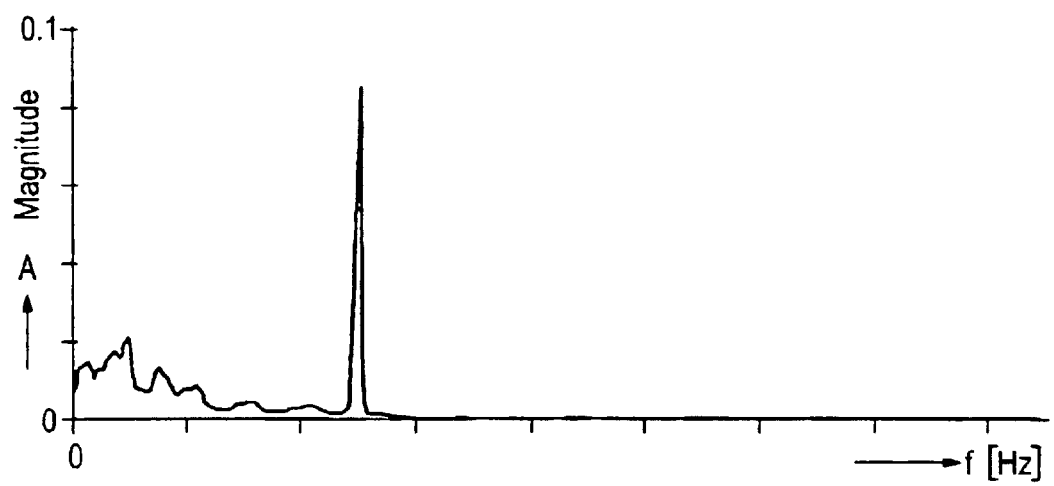
FIGS. 7 and 8 are graphs plotting the oscillation spectra of a fuel element without and with internal friction and corresponding damping of the fuel rods.
Figure 8:
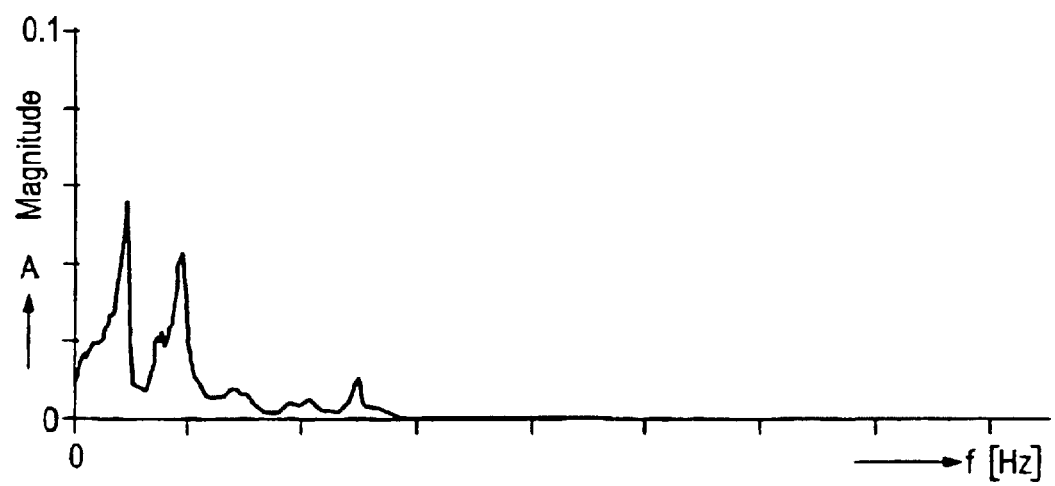

FIG. 7 shows a frequency spectrum corresponding to FIG. 5 for a fuel element in which the (N-2) mode has a damping of 0.3%, while FIG. 8 uses fuel rods which do not have a wire but have otherwise remained identical. In this case, the damping has increased from approximately 0.3 to approximately 0.5%; surprisingly, this minor increase in absolute terms of only 0.2% has caused the striking oscillation in FIG. 7 to virtually disappear.

These tests show that the spring force of standard spacers is not sufficient, even in the BOL state, to avoid high-amplitude oscillations with a frequency of 25 Hertz, and even that the high spring force is harmful and causes the spring force to drop toward lower amplitudes. By contrast, it is evidently sufficient if the damping is increased; damping which amounts to 0.5% or even just 0.4% is already sufficient for the particularly striking oscillation of 25 Hertz.

Figure 9:
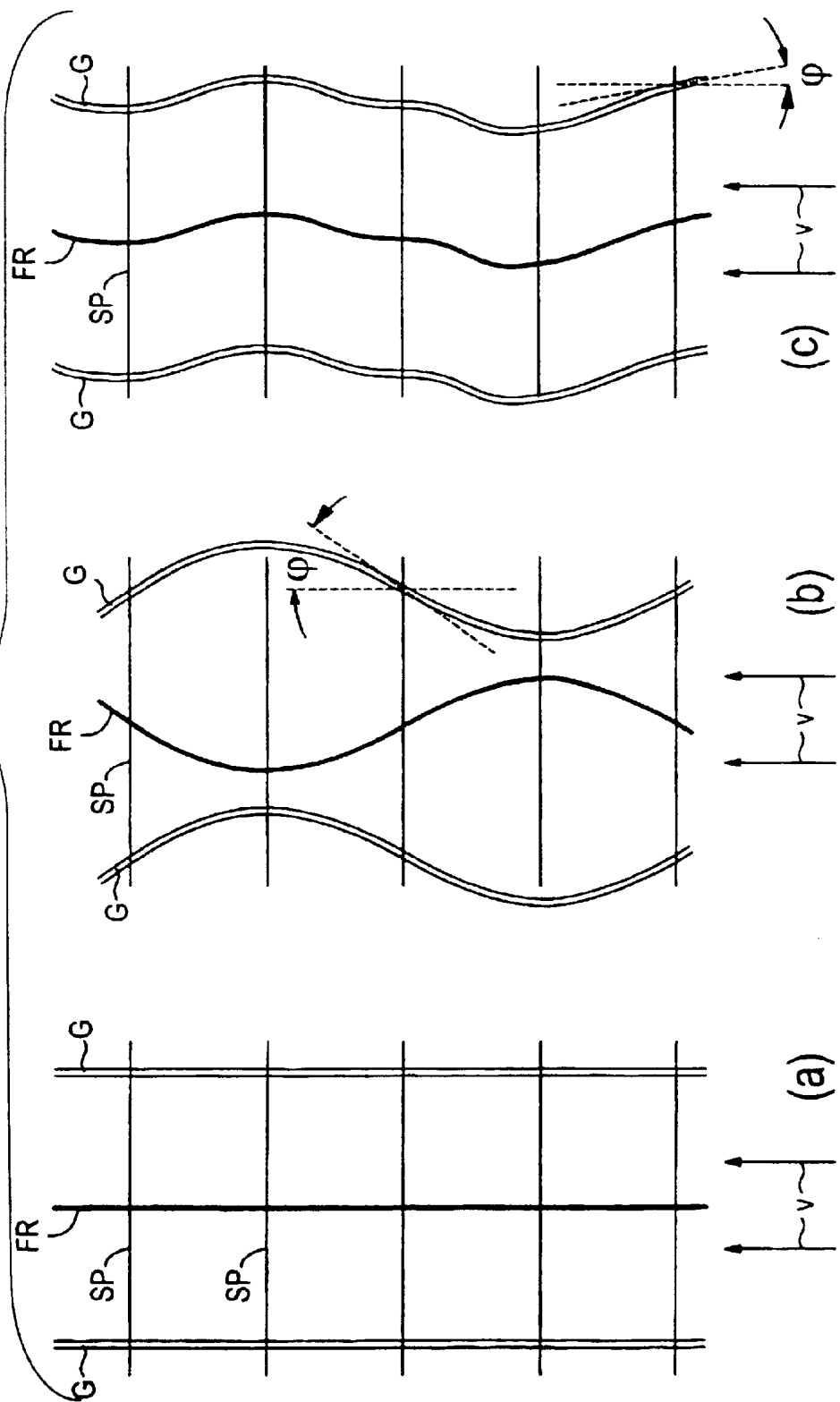
FIG. 9 diagrammatically depicts the at-rest state in view (a), an impossible oscillation state in view (b), and a possible oscillation state of the fuel element in view (c)

To explain the natural oscillations of a fuel element, the fuel element in FIG. 9 is symbolically indicated by a fuel rod FR which is arranged between two guide tubes by means of spacers SP. In state (a), the fuel element is at rest or the holding elements, by means of a very high spring force, are ensuring that the fuel rods and guide tubes cannot move relative to the spacers, i.e. cannot execute either translational or tilting movements. In this case (rigid holding), of course, there is no fretting between fuel rod and spacer. However, if the fuel rods and guide tubes were able to execute major translational and tilting movements virtually independently of one another, state (b) would be possible.

However, states of this nature are unrealistic, since in this case the relative distances between the fuel rods and guide tubes change considerably whereas the spacers only allow very slight changes in these distances. Therefore, in practice only synchronous movements can be excited. Moreover, the fuel rods execute tilting movements (tilting angle φ) with respect to the fuel elements which are likewise only possible with a certain mobility of the fuel rods in the holding elements.

If the fuel rods are held very rigidly in the spacers, however, states (c) may occur, in which both the distances between the individual fuel rods and the distances between the fuel rods and the guide tubes remain virtually identical and negligible tilting angles φ occur. In this case, state (c) represents a particularly favorable oscillation, since in this case φ is virtually always zero in the spacer planes, i.e. the fuel rods do not work counter to the spring forces of the holding elements, but rather maintain their relative at-rest position with respect to the spacers. Oscillations of this nature do not cause any fretting damage but mean a high-order mode.

Figure 10:
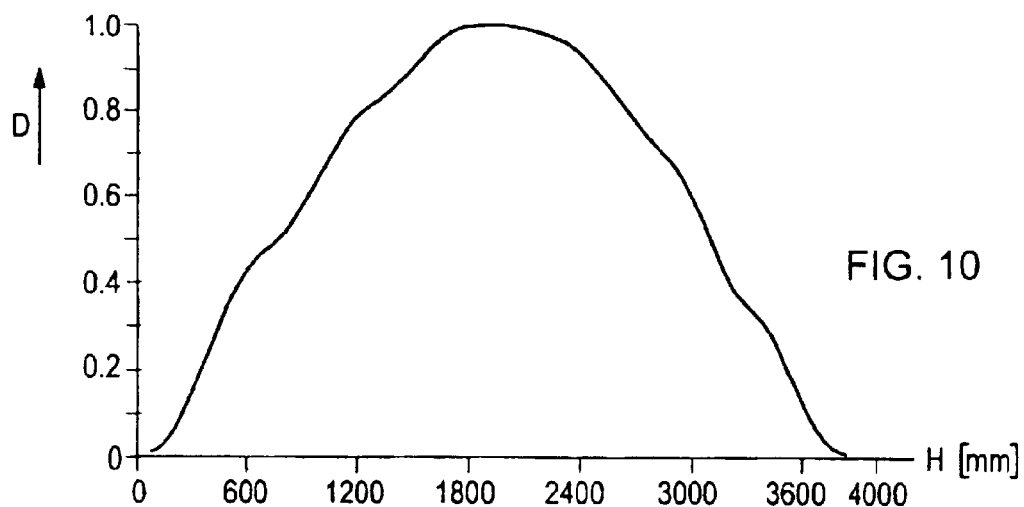
FIG. 10 is a graph plotting the displacement of the fuel rod with respect to its at-rest position as a function of the location on the fuel rod, in the event of an oscillation-induced deviation.

In the case of lower orders, the conditions are different. FIG. 10 shows measurements of the translational displacement D of a fuel rod with respect to its at-rest position in the event of a first-order bending vibration as a function of the distance H from the lower end of the fuel rod. The distortion of the sinusoidal shape caused by the spacers is clearly apparent from this figure.

The deviation from the sinusoidal shape becomes even clearer if the angle φ, i.e. the tilting angle between the fuel rod (or guide tube) and the perpendicular to the spacer, is determined from FIG. 10. The deviation from the sinusoidal oscillation makes its presence clearly apparent by marked spikes which in each case lie in the planes of the spacers located between the first (bottom) spacer and the eighth (top) spacer. In this case, the oscillating fuel rod works counter to the forces of its holder. However, this oscillation is relatively strongly damped by the spring forces of the holder; therefore, this oscillation is only weakly excited in the oscillation spectrum.

Figure 12:
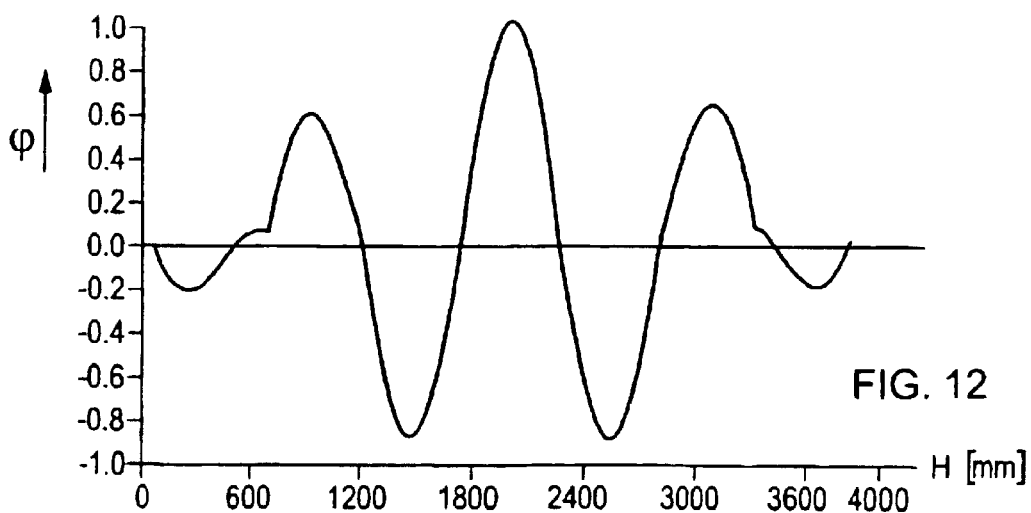

If the corresponding profile of the tilting angle φ is determined for the sixth-order bending vibration, FIG. 12 shows that these spikes have disappeared, not completely but nevertheless substantially. In this mode, therefore, fuel rod and fuel element can move virtually sinusoidally without working against their holder, since the oscillation nodes of this sinusoidal oscillation lie practically in the planes of the spacers. The damping of the oscillation in the planes of the spacers is correspondingly low.

However, the fuel rods are not held in punctiform manner in the spacer, but rather their bearing surfaces have an axial extent.

Figure 11:
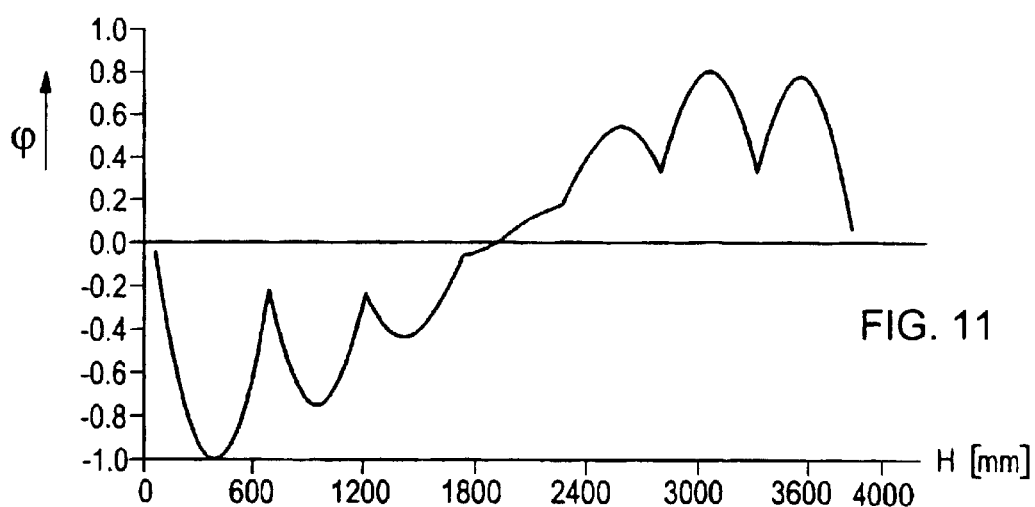
FIGS. 11 and 12 are curves of the tilting angles of the fuel rod as a function of the location for modes of order 1 and (N-2)
Figure 13:
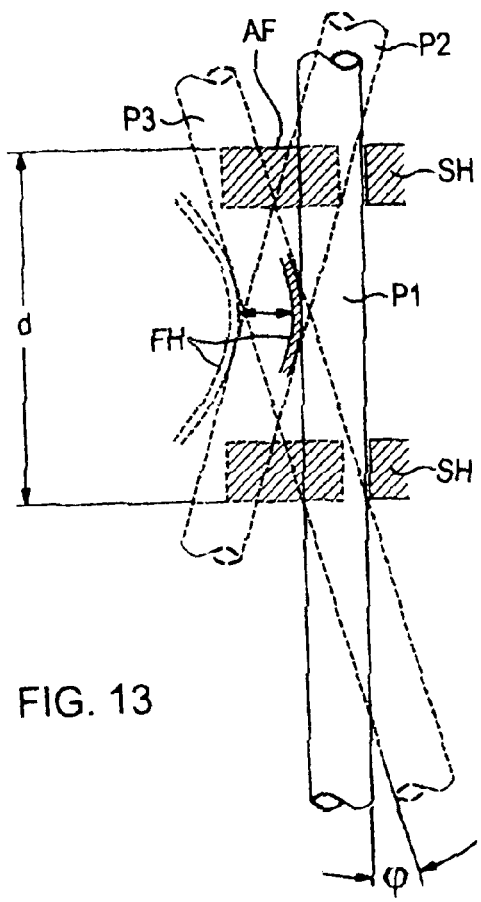
FIG. 13 is a diagram showing the positions of fuel rod and resilient holding element in the event of tilting oscillations in standard spacers.

FIG. 13 explains the influence which, with a finite axial extent, the spring force of the holding elements on an oscillation as shown in FIGS. 11 and 12 has on the fretting. In the at-rest position of the fuel rod (position P1), the fuel rod is pressed onto the rigid holding elements SH by the spring force of the resilient holding element FH in such a manner that the fuel rod is oriented perpendicular to the spacer. If the fuel rod is then made to deviate by the tilting angle φ in one direction (position P2) or the other direction (position P3), the resilient holding element FH works against this deviation and removes energy from the movement of the fuel rod, i.e. damps the corresponding oscillations, this damping being relatively substantial in the low modes, i.e. counteracting excitation of the oscillation. The greater damping in the low modes leads to the energy transmitted from the turbulent flow of cooling water being dissipated via the spring elements without high amplitudes of the corresponding bending vibration being induced.

At high modes, by contrast, the reduced tilting movement leads to weaker damping; excitations from the coolant are only weakly damped. It is now possible for the major deviations which can be seen from FIG. 5 to occur.

In FIG. 13, AF denotes the regions in which, during the movements shown, fretting occurs between fuel rod and two bearing surfaces. Marks of considerable abrasion only occur at these holding elements, which in the prior art are rigid. This is in line with the observations that specifically only the rigid holding elements of the spacers cause corresponding abrasion marks on the fuel rods of the fuel elements. For this reason, it appears advantageous for as far as possible all the holding elements to be of resilient design. Moreover, in tests abrasion marks of this type are only found at frequencies of the fuel rods which correspond to the orders (N-2) and (N-3).

Figure 14:
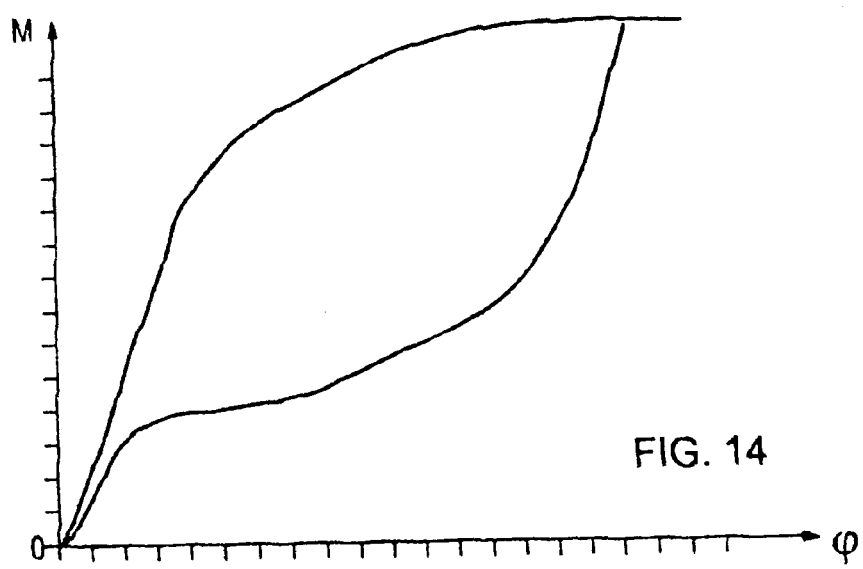
FIG. 14 plots the torque M required for a tilting angle φ of a fuel rod with a spacer as shown in FIG. 13.

If the torque M which is required to deflect the fuel rod through the tilting angle φ is measured, as a function of this angle, the hysteresis curve shown in FIG. 14 results: even with a low but finite angle (e.g. φ=0.1°), a finite torque is always required.

Figure 16:
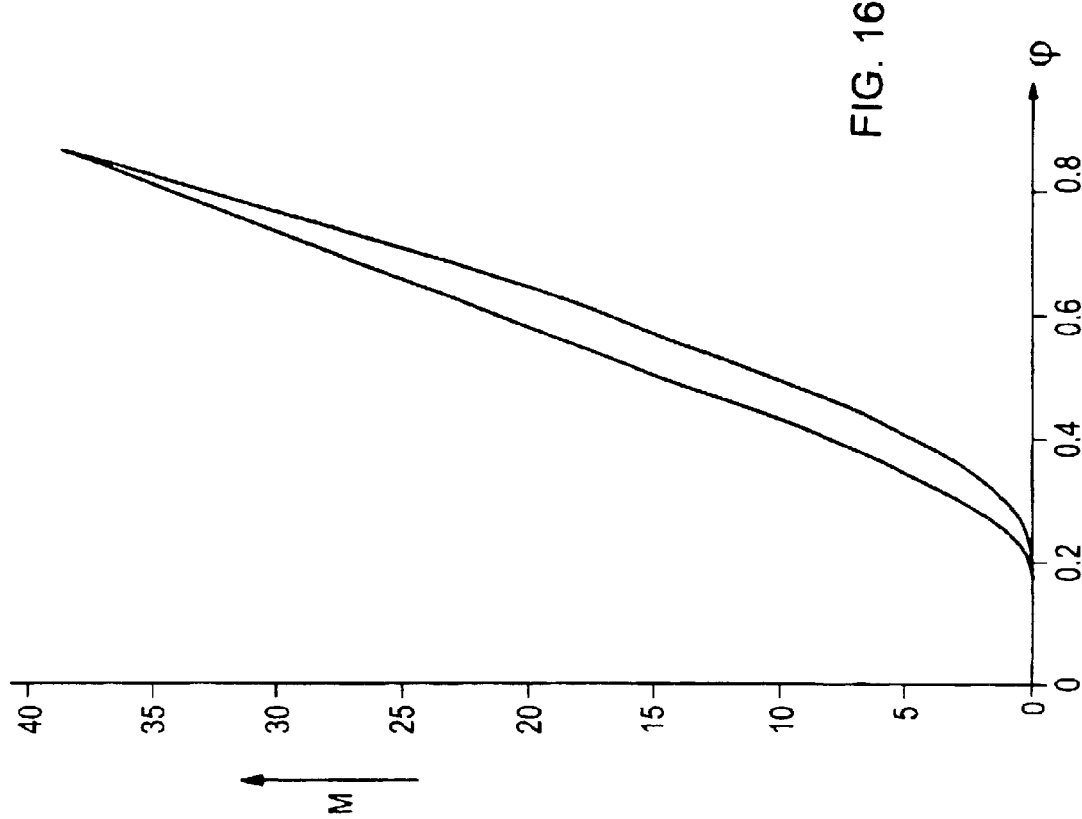
FIG. 16 is a graph, similar to FIG. 14, showing the torque M for the invention.
Figure 15:
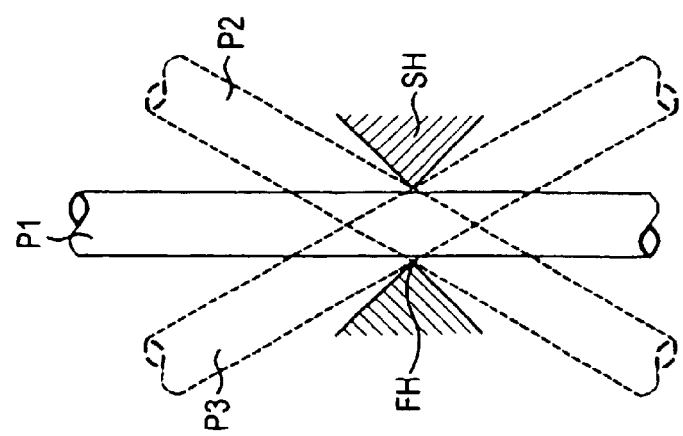
FIG. 15 is a diagram, similar to FIG. 13, showing fuel rod positions according to the invention.

At low spring force, however, this torque M decreases to the extent by which the axial distance d between the top and bottom points of the rigid holding elements SH is reduced in FIG. 13. If this distance d and the bearing surface of the resilient holding element FH are each drawn together to form a point, as shown in FIG. 15, there is virtually no further torque M required even for large tilting angles φ (FIG. 16). The performance of the fuel rod is then virtually independent of the spring force.

Figure 17:
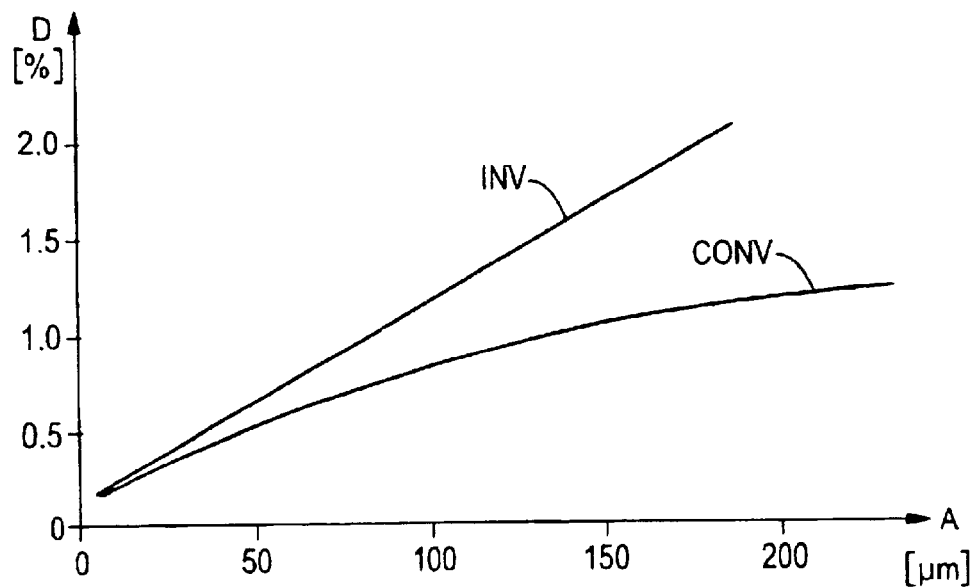
FIGS. 17 and 18 plot the damping for the modes (N-3) and (N-2) respectively, with conventional bearing (CONV) and in accordance with the invention (INV)
Figure 18:
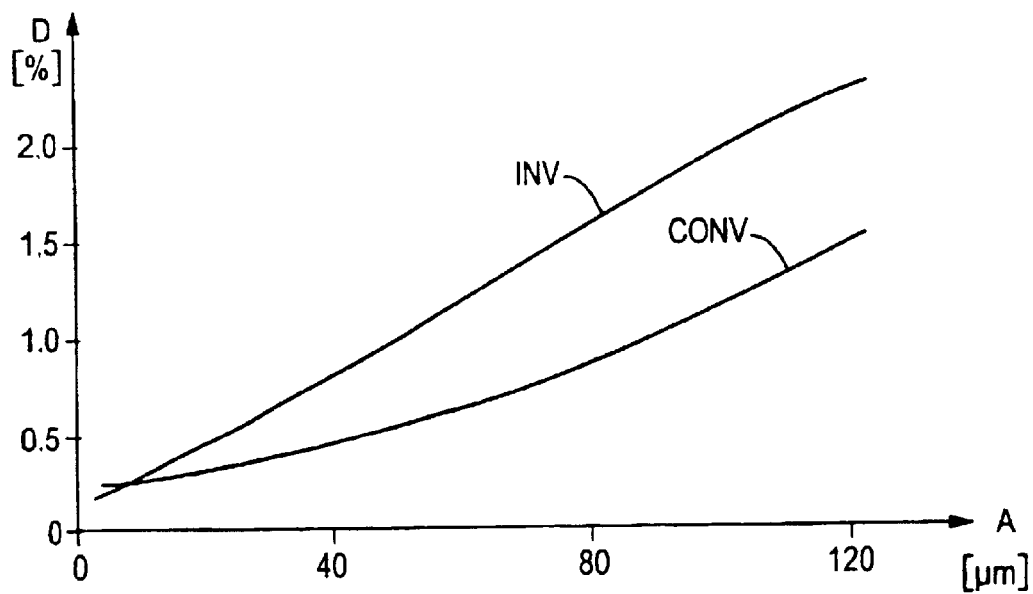

However, micro-movements do still occur, constantly withdrawing energy from a corresponding tilting vibration, the increased tilting mobility of the fuel rod mounted in this manner leading to greater damping of the corresponding modes. Therefore, the extent of the bearing surfaces must not be too small. In FIG. 17, the curve CONV shows the damping function of the deviation (amplitude) of the fuel rod in mode (N-3) for a distance d=30 mm which is conventional in practice, and the curve INV shows the corresponding damping for the innovative distance d=3 mm proposed here. The corresponding curves for mode (N-2) are shown in FIG. 18.

With the design principle of the abovementioned HTP spacer (FIGS. 19, 20, 21), with the exception of the edge web 30, double webs 31 are used, formed from two walls 32 and 33 which bear flat against one another and are secured to one another. These double webs are fitted into one another in such a manner that square mesh openings 35 are formed, these mesh openings 35 being used to receive a fuel rod 36 or guide tube 37. At the intersection 39 of two double webs 31 and 34, each of these double webs (width b=4 to 4.5 cm) has a first longitudinal slot 38. Furthermore, each wall which delimits a mesh opening intended to receive a fuel rod has a second longitudinal slot 41, the two slots being of approximately the same length (length 1 between 0.6 and 0.65 mm) and ending at approximately the same distance from the bottom edge and top edge of the double webs. In the center between two intersections, each wall which delimits a mesh opening intended for a fuel rod is bent toward the center axis of the mesh opening delimited by the wall, with the result that a passage 40 which continues all the way from the bottom to the top is formed between the walls. These passages are curved at their upper end 45, with the result that the cooling water flowing out of these passages acquires a swirl component 47 around the fuel rod. Furthermore, the walls 48, 49 on both sides of every second slot 41 are curved around an axis perpendicular to the fuel rod in such a manner that the fuel rod in question has a bearing length d as soon as the fuel rod is inserted into the mesh opening.

It can be seen that the curvature at the end 45 of the passages is not required for the fretting performance. Rather, it may even be advantageous to use completely straight passages, in which case flow-guiding surfaces may be fitted to the top edges of the walls, imparting other flow paths to the cooling water. It is also possible for those edges of the second slots which serve to spring mount the holding elements to be replaced by other resilient holding elements, in which case the second slots can be dispensed with altogether. Moreover, it may be advantageous for the length d to be set to less than 3 mm. Conversely, when designing the previous HTP spacers, it has been assumed that d is approximately 15 mm.

Figure 21:
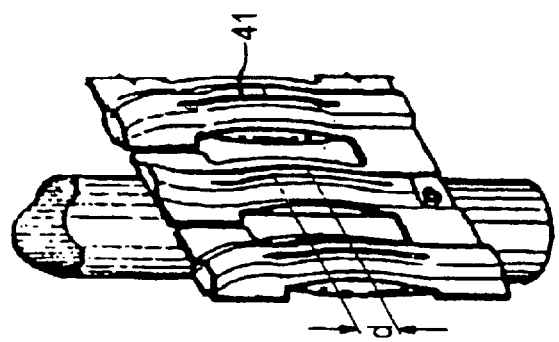
FIG. 21 is a partial perspective view of the action of the passage on the fuel rods of this spacer.
Figure 20:
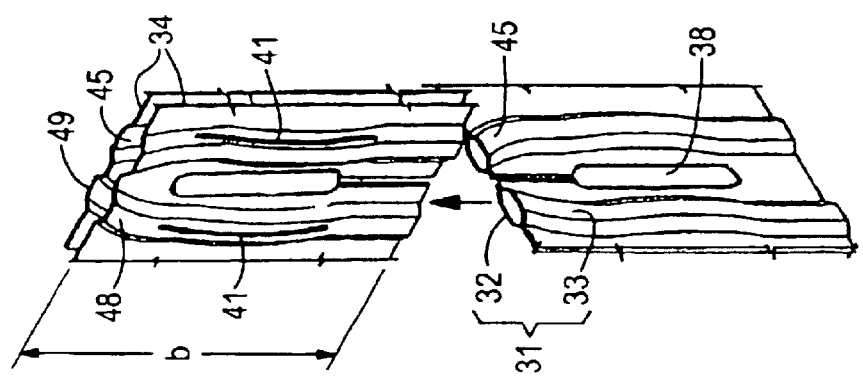
FIG. 20 is a partial perspective view of the double webs of this spacer prior to assembly.
Figure 19:
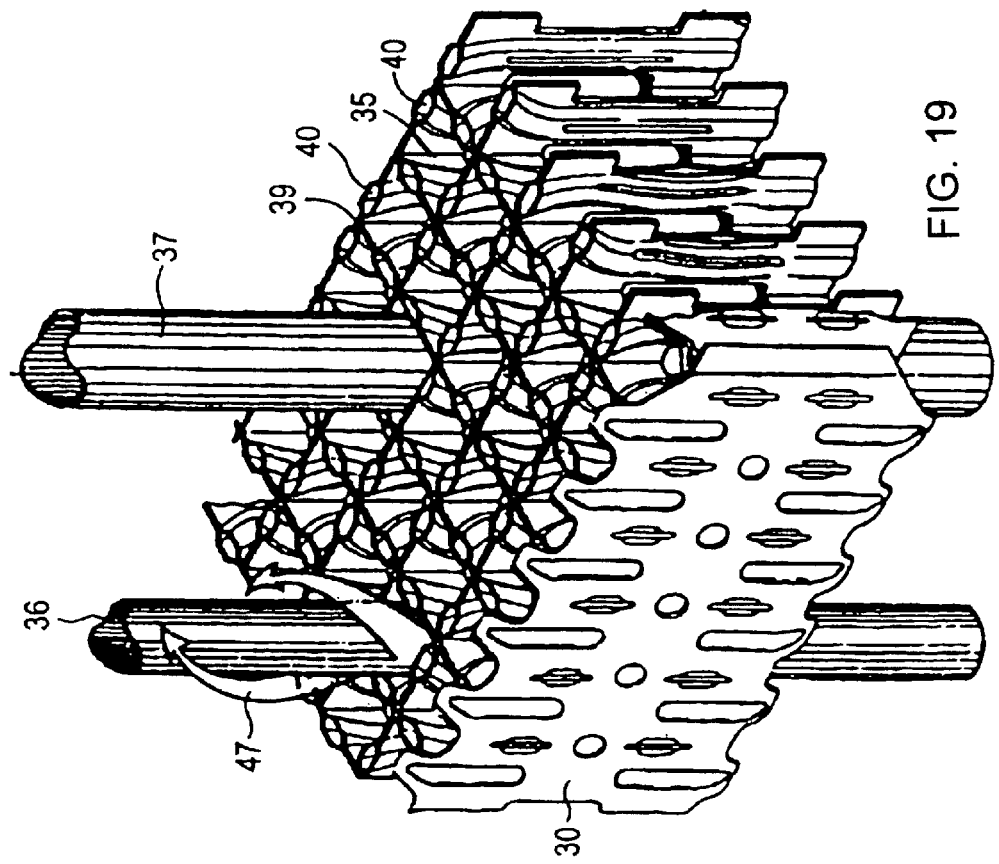
FIG. 19 is a perspective view of an HTP spacer with guide tube and a fuel rod.
Figure 22:
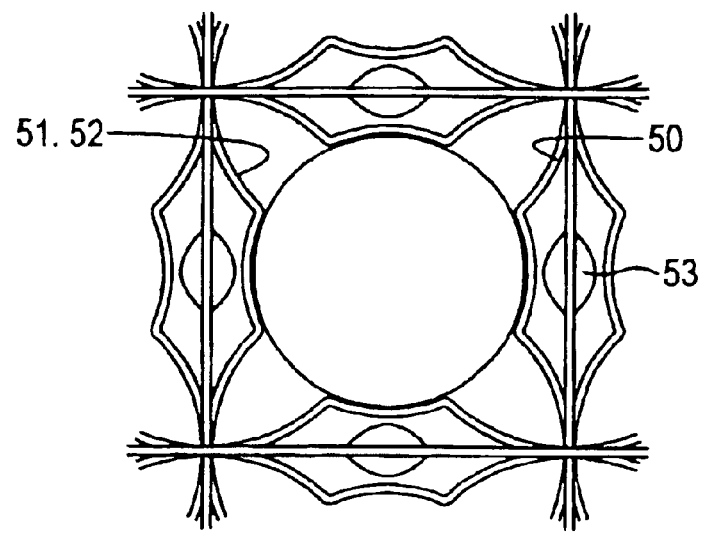
FIG. 22 is a plan view onto a further exemplary embodiment of a spacer according to the invention.
Figure 23:
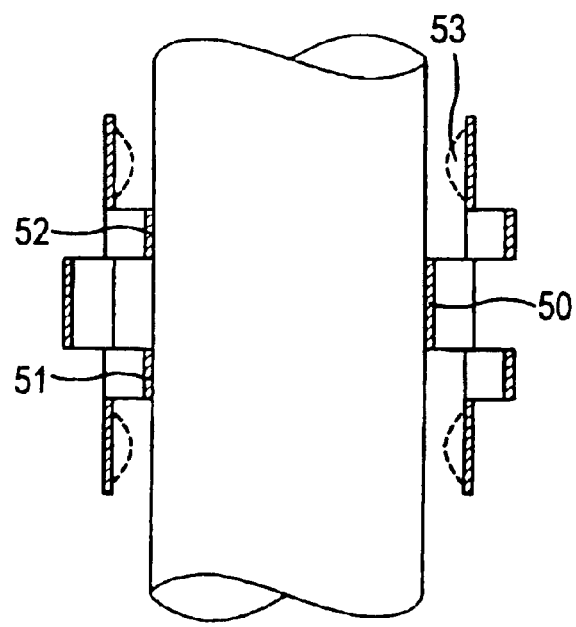
FIG. 23 is a side-elevational view thereof.

While the exemplary embodiment shown in FIGS. 2 and 3 shows three-point holding and the exemplary embodiment shown in FIGS. 19–21 illustrates eight-point holding, FIGS. 22 and 23 show six-point holding. In this case, it is provided for advantageously all the holding elements to be of resilient design, and in this exemplary embodiment in each case one spring 50 on one mesh opening wall presses the fuel rod onto two springs 51, 52 located one above the other on the opposite wall. Moreover, the dashed contour 53 in FIG. 23 also shows rigid stops for limiting the amplitudes.

To measure the reduction in fretting damage which is achieved by the invention, it is possible to add up the reductions in the wall thickness produced by fretting at one of the holding elements in a mesh opening. Tables 1 and 2 below compare the dimensions obtained by this addition for a conventional spacer (tests 1 to 4) with d=30 mm and the corresponding dimensions of a spacer according to the invention (tests 5 to 7) with d=3 mm. The fuel elements were electromagnetically excited in the modes which were also observed in the reactor. However, the amplitudes were set to a constant level which is atypically high for reactor operation; this is because in this way it was possible to obtain comparison values within a reasonable time.

The differences which occur are particularly noticeable, since they are mainly attributable to the different damping of mode (N-2), yet in both cases this damping is only very slight. However, the increased damping is for its part attributable to the fact that the mobility of the fuel rods, which is actually to be regarded as a cause of the significantly reduced fretting in the tests 5 to 7, is significantly increased.

TABLE 1

| Test No. | Test duration 25 h | Test duration 50 h | Test duration 75 h | Test duration 100 h |
|---|---|---|---|---|
| 1 | 60 | 120 | | 220 |
| 2 | 80 | 150 | 210 | 250 |
| 3 | 100 | 130 | 190 | 250 |
| 4 | 50 | 80 | 150 | 230 |
| 5 | 10 | 10 | 10 | 10 |
| 6 | 0 | 0 | 0 | 0 |
| 7 | 0 | 10 | 10 | 20 |

We claim:

1. In a fuel element of a nuclear reactor cooled by a coolant flow of light water, a spacer assembly for a plurality of fuel rods, comprising:
   a spacer formed with mesh openings each for a fuel rod projecting therethrough and defining a given spacer plane;
   a plurality of holding elements disposed in each of said mesh openings and formed to laterally support said fuel rod and to limit and dampen a relative mobility of the fuel rod with respect to said spacer and for allowing the fuel rod to be set predominantly into tilting oscillations in the spacer plane by the coolant flow; and
   said holding elements exerting a maximum torque up to M (torque)=10 N·mm on a fuel rod at a tilting angle $\phi=0.1°$, having an axis of rotation running perpendicular to the fuel rod in the spacer plane.

2. The spacer according to claim 1, wherein said holding elements in at least one of said mesh openings are formed with a plurality of elongate bearing surfaces for bearing against the fuel rod, said elongate bearing surfaces having a longitudinal extent of at least 1 mm, and wherein, in an unirradiated state of said spacer, a highest bearing point of the fuel rod in the respective said mesh opening lies at most 10 mm above a lowest bearing point of the fuel rod in said mesh opening.

3. The spacer assembly according to claim 2, wherein the highest bearing point lies at most 5 mm above the lowest bearing point of the fuel rod in said mesh opening.

4. The spacer assembly according to claim 2, wherein the highest bearing point lies at most 3 mm above the lowest bearing point of the fuel rod in said mesh opening.

5. The spacer assembly according to claim 1, wherein said spacer is formed with inner mesh openings and said holding elements are disposed at least in said inner mesh openings.

6. The spacer assembly according to claim 1, wherein said holding elements are disposed in all said mesh openings of said spacer.

7. The spacer assembly according to claim 2, which further comprises, in each mesh opening including holding elements with said bearing surfaces, stops for limiting a lateral deviation of the fuel rod with respect to an at-rest position thereof to a range from 0.1 to 0.5 mm, said stops being formed in a plane above said bearing surfaces and a plane below said bearing surfaces.

8. The spacer assembly according to claim 2, which further comprises, in each mesh opening including holding elements with said bearing surfaces, stops for limiting a lateral deviation of the fuel rod with respect to an at-rest position thereof to substantially at most 0.3 mm, said stops being formed in a plane above said bearing surfaces and a plane below said bearing surfaces.

9. The spacer assembly according to claim 7, wherein a respective said stop is disposed above and below each said bearing surface.

10. The spacer assembly according to claim 1, wherein said holding elements in at least one of said mesh openings are formed with a plurality of elongate bearing surfaces for bearing against the fuel rod, and the fuel rod is supported against said holding elements of said mesh opening at fewer than eight elongate bearing surfaces.

11. The spacer assembly according to claim 2, wherein the fuel rod is supported against said holding elements of said mesh opening at fewer than eight elongate bearing surfaces.

12. The spacer assembly according to claim 2, wherein said bearing surfaces are oriented parallel with respect to the fuel rod.

13. The spacer assembly according to claim 2, wherein said bearing surfaces are distributed equidistantly over a periphery of the fuel rod.

14. The spacer assembly according to claim 2, wherein said bearing surfaces are distributed in pairs and equidistantly over a periphery of the fuel rod.

15. A fuel element for a nuclear reactor cooled by a flow of light water, which comprises: a foot, a head, and at least one spacer assembly according to claim 1 between said foot and said head.

16. The fuel element according to claim 15, wherein said spacer assembly according to claim 1 is a bottom spacer of a plurality of spacers between said foot and said head.

* * * * *